under 35
U.S.C. 154(b) by 1183 days.

(12) United States Patent (10) Patent No.: US 8,221,689 B2
Boutot et al. (45) Date of Patent: Jul. 17, 2012

(54) DECOMPOSITION OF NATURAL GAS OR METHANE USING COLD ARC DISCHARGE

(75) Inventors: Tobie Jean Boutot, Moncton (CA); Zhuomin Liu, Moncton (CA); Kenneth Ricky Buckle, Flatrock (CA); Francis Xavier Collins, Lincoln (CA); Charles Andrew Estey, Oromocto (CA); Donald MacFarlane Fraser, Fredericton (CA); Stanley Jaye Claus, Burton (CA); Thomas Keith Whidden, Fredericton (CA)

(73) Assignee: Atlantic Hydrogen Inc., Fredericton (CA)

( * ) Notice: Subject to any disclaimer, the term of this patent is extended or adjusted under 35 U.S.C. 154(b) by 1183 days.

(21) Appl. No.: 11/795,372

(22) PCT Filed: Apr. 28, 2006

(86) PCT No.: PCT/CA2006/000671
§ 371 (c)(1),
(2), (4) Date: Jul. 16, 2007

(87) PCT Pub. No.: WO2007/019664
PCT Pub. Date: Feb. 22, 2007

(65) Prior Publication Data
US 2009/0038933 A1 Feb. 12, 2009

(30) Foreign Application Priority Data

Aug. 19, 2005 (CA) .................................... 2516499

(51) Int. Cl.
*B01J 19/08* (2006.01)
*B01J 12/02* (2006.01)
(52) U.S. Cl. ............... 422/186.21; 422/186.26; 204/170
(58) Field of Classification Search ............. 422/186.04, 422/186.21, 186.26; 204/170
See application file for complete search history.

(56) References Cited

U.S. PATENT DOCUMENTS
5,205,912 A 4/1993 Murphy
(Continued)

FOREIGN PATENT DOCUMENTS
CA 2 154 482 8/1994
(Continued)

OTHER PUBLICATIONS

A. Czernichowski et al.; Pyrolysis of Natural Gas in the Gliding Electric . . . ; 10th Canadian Hydrogen Conference; May 2000, Quebec, Canada.
(Continued)

*Primary Examiner* — Kishor Mayekar

(57) ABSTRACT

A cold arc discharge is used to decompose natural gas or methane into its gaseous constituents and carbon in the form of solid particles. The gaseous constituents obtained are mainly hydrogen and acetylene and they are produced in admixture with unreacted natural gas or methane. The cold arc discharge is generated by a pulsating high voltage discharge imparted through a capacitor to a high voltage electrode or a plurality of high voltage electrodes or through a high voltage electrode to a plurality of capacitor-connected electrodes placed in a reaction zone. The apparatus for performing this process may have a tubular reactor with a cylindrical ground electrode in the middle and a cylindrical outer wall through which the high voltage electrode or electrodes extend into the reaction zone. The apparatus may also have a cylindrical shaft in the middle made of dielectric material in which a plurality of electrodes are embedded, this shaft being surrounded by a high voltage tubular electrode. Natural gas or methane is passed through the reaction zone where it is subjected to the cold arc discharge or discharges and the resulting products flow out of the reactor and solid carbon particles are separated from the remaining gases that are then analysed.

18 Claims, 10 Drawing Sheets

U.S. PATENT DOCUMENTS

| | | | |
|---|---|---|---|
| 5,516,967 A | 5/1996 | Pandey et al. | |
| 5,874,705 A | 2/1999 | Duan | |
| 6,099,696 A | 8/2000 | Schwob et al. | |
| 6,353,206 B1 | 3/2002 | Roderick | |
| 6,441,554 B1 | 8/2002 | Nam et al. | |
| 6,836,073 B2 | 12/2004 | Matsushita | |
| 6,924,608 B2 * | 8/2005 | Czernichowski et al. | 315/335 |

FOREIGN PATENT DOCUMENTS

| | | |
|---|---|---|
| CA | 2353752 | 1/2003 |
| JP | 2002/241774 | 8/2002 |
| WO | WO 94 17908 | 8/1994 |
| WO | WO 97/14278 | 4/1997 |
| WO | WO 98/30524 | 7/1998 |
| WO | WO 02/26378 | 4/2002 |
| WO | WO 03/040027 | 5/2003 |
| WO | WO 2004/061929 A1 | 7/2004 |

OTHER PUBLICATIONS

Czernichowski A., Wesolowska K.; Glidarc-Assisted Production of Synthesis . . . ; Fuel Cell Science, Engineering and Technology, 2003, pp. 181-185.

* cited by examiner

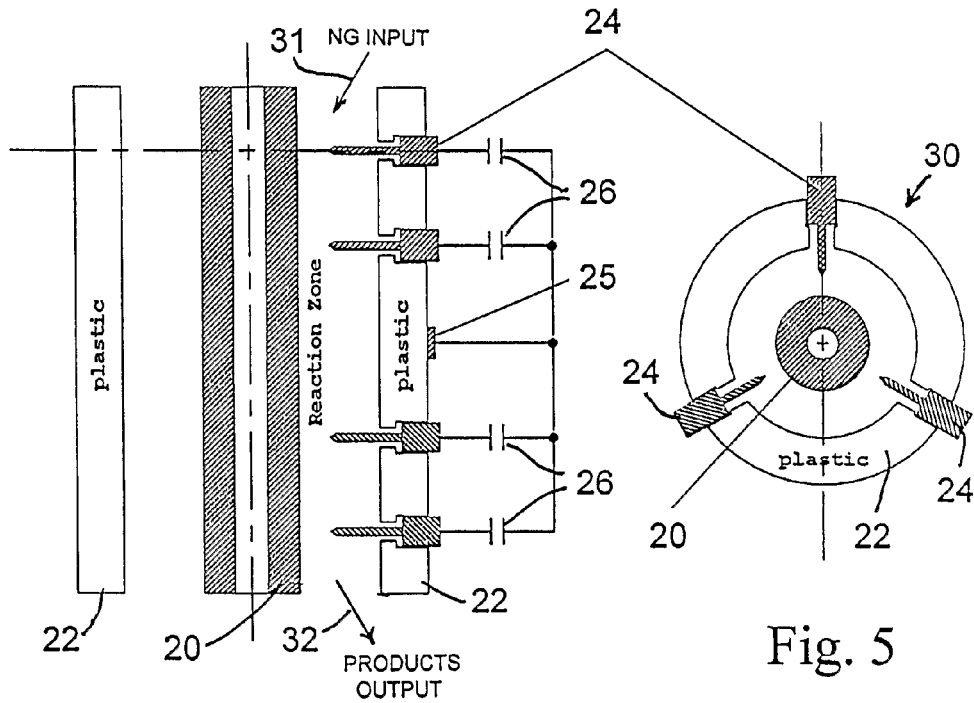
Fig. 4
Fig. 5
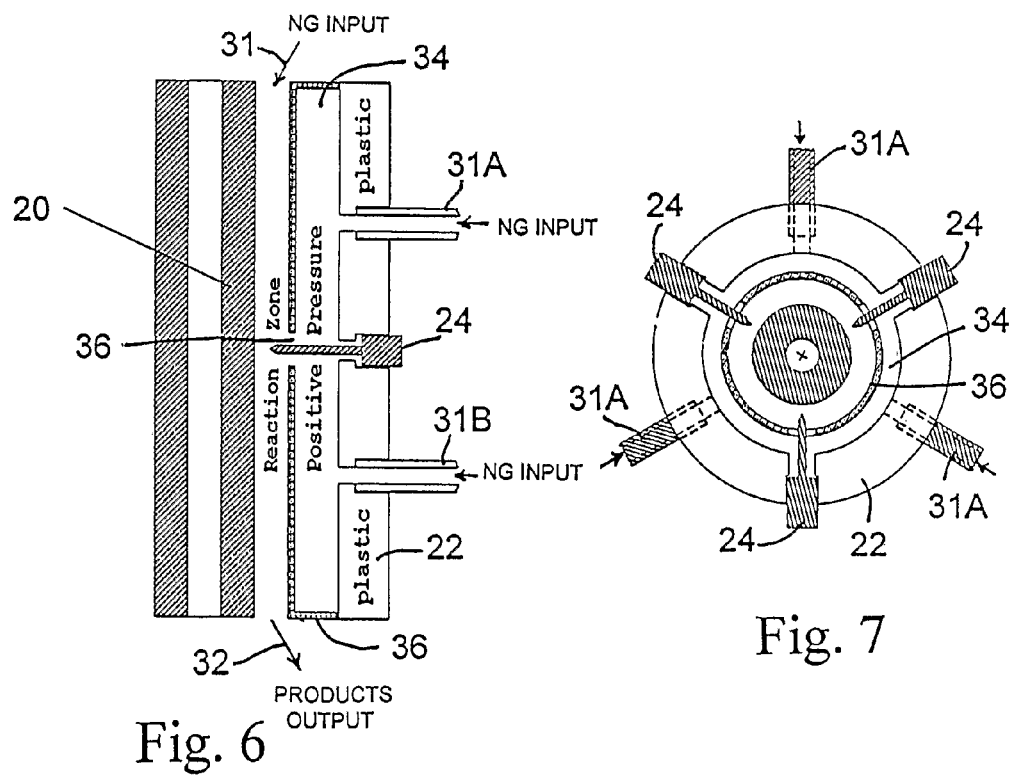
Fig. 6
Fig. 7

US 8,221,689 B2

DECOMPOSITION OF NATURAL GAS OR METHANE USING COLD ARC DISCHARGE

CROSS-REFERENCE TO RELATED APPLICATIONS

This application is the U.S. National Phase of Internal Application PCT/CA2006/000671 filed on Apr. 28, 2006.

FIELD OF THE INVENTION

This invention relates to a method and an apparatus for the decomposition of natural gas or methane into its gaseous constituents and carbon using cold arc discharge. More particularly, the invention relates to the use of a cold arc discharge in order to achieve the decomposition of natural gas or methane into carbon in the form of solid particles and gaseous products consisting mainly of hydrogen and acetylene in admixture with unreacted methane.

BACKGROUND OF THE INVENTION

Arc discharge has been known for a long time. A sustained arc will generate hot plasma. However, by controlling the arc, one can generate a cold arc discharge producing a very dense plasma, but with considerably less heat. In the past, a small pulse width using a flyback transformer produced such dense plasma, but it was a rather difficult and expensive way of generating a "cold arc".

In Canadian patent application No. 2,353,752 there is disclosed a method and an apparatus for producing hydrogen and carbon from natural gas or methane using a barrier discharge non-thermal plasma, which is also called "cold plasma". Such process requires, however, the use of precisely designed and formulated ceramic materials as the dielectric barrier. Such materials may be difficult and expensive to obtain or produce. There is, therefore, a need for a method and an apparatus that would transform natural gas or methane primarily into hydrogen and carbon without requiring such materials.

SUMMARY OF THE INVENTION

It has been surprisingly found that hydrogen and carbon can be produced from natural gas or methane by using cold arc discharge instead of dielectric barrier discharge. It should be noted that the chemical reaction mechanism remains similar in both the dielectric barrier discharge (DBD) and cold arc discharge (CAD), namely the general chemical reaction is:

$$CH_{4(g)} \rightarrow C_{(s)} + H_{2(g)}$$

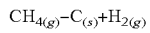

However, the microdischarges in DBD are specifically produced so as not to fall into an arcing mode, whereas in CAD arcs of controlled time duration and frequency are produced to carry out the reaction.

A cold arc discharge may be defined as an intermittent arc discharge that makes it possible for the reactor to operate at relatively low temperatures, typically below 200° C. On the other hand, the hot arc discharge produces a continuous plasma arc which generates temperatures within the reactor in the range of 1700° C. to 4000° C. and higher, since the temperature of the hot plasma is in excess of 4000 K.

The present applicant has found that it is possible to generate a cold arc discharge by limiting the lifetime of an arc during a discharge by using a capacitor in series with a high voltage electrode while using a pulsating high voltage discharge, and further that the cold arc so produced is well suited for promoting the reaction mentioned above, namely dissociation of natural gas or methane into its components. It should be noted that the resulting products contain in addition to hydrogen and carbon, a small but measurable amount of acetylene and trace amounts of some other hydrocarbons that are usually produced in such reactions.

The resulting gas flow exiting from the reactor is then normally passed through a solids collector, such as a HEPA (high efficiency particle arrester) to collect the typically nanoscale solid carbon particles that occur as a result of the process and the remaining gaseous mixture comprising essentially unreacted natural gas, hydrogen and acetylene proceeds to equipment that measures the gas composition and collects or further processes that gaseous mixture.

Thus, in essence, the method of the present invention for decomposing natural gas or methane into its gaseous constituents and carbon comprises passing a flow of natural gas or methane through a reaction zone and generating a cold arc discharge in said reaction zone adapted to decompose the natural gas or methane into its gaseous constituents and carbon in the form of solid particles.

In a more specific embodiment, the method comprises:
(a) passing a flow of natural gas or methane through a reaction zone having a ground electrode on one side and a wall of dielectric material on the other, and having a high voltage (HV) electrode projecting through the wall of dielectric material, said HV electrode having a capacitor in series therewith; and
(b) imparting a pulsating high voltage discharge through said capacitor and into said IV electrode so as to produce a cold arc discharge in the reaction zone between said HV electrode and the ground electrode, which decomposes the natural gas or methane into its gaseous constituents and carbon in the form of solid particles.

In order to make the system more efficient, a plurality of HV electrodes with capacitors in series therewith may be installed in the reaction zone and arranged in such a manner as to produce a high degree of conversion. The wall of dielectric material through which the HV electrode or electrodes are projected need not be of any special material, and may be, for example, made of plastic that would resist temperatures of the order of 200° C.-400° C. If desired, however, walls of ceramic material may also be used.

In another embodiment, the method comprises:
(a) passing a flow of natural gas or methane through a reaction zone formed between an electrode connected in series with a capacitor which is connected to the ground through a dielectric element on one side and a high voltage (HV) electrode on the other side; and
(b) connecting a pulsating high voltage source to the HV electrode, so as to generate a cold arc discharge in the reaction zone between the HV electrode and the capacitor-connected electrode, said cold arc decomposing the natural gas or methane into its gaseous constituents and carbon in the form of solid particles.

In this embodiment, a plurality of capacitor-connected electrodes may also be installed in the reaction zone. This may be done by mounting them on a central cylindrical shaft made of dielectric material and surrounding this shaft with the HV electrode in the form of a tubular metal wall which is connected to the HV source.

The basic apparatus in accordance with the present invention comprises a reactor with a reaction zone, means for passing a flow of natural gas or methane through said reaction zone and means for generating a cold arc discharge or a plurality of cold arc discharges in said reaction zone such as to convert the natural gas or methane into its gaseous constituents and carbon.

In one non-limitative embodiment, the reactor has a tubular shape with a rotatable cylindrical ground electrode made of a conducting material, such as aluminum or steel, in the middle and with an outer wall of dielectric material, such as a plastic or ceramic, through which a plurality of HV electrodes extend into the reaction zone formed in the space between the ground electrode and the outer wall. Each of the HV electrodes is provided with a capacitor in series and is connected through the capacitor to a pulsating high voltage source adapted to produce a high frequency cold arc discharge between each HV electrode and the ground electrode. This enables conversion of the natural gas or methane introduced through an inlet port or ports and flowing through the reaction zone, into its gaseous constituents and carbon. The ground electrode is normally rotated during the operation of the reactor so that carbon would not form conducting bridges between the electrodes. Rotating speeds between 60 RPM and 200 RPM may be used. Outside of the reactor, means are provided to separate the solid particles of carbon from the gaseous products and to analyse the latter to determine the gaseous constituents.

In another embodiment, the reactor again has a tubular shape, but with a rotatable cylinder of dielectric material in the middle, in which are embedded a plurality of electrodes extending outwardly from the cylindrical surface. Each such electrode is provided with a capacitor in series and is connected to a common ground. This is surrounded by a metal tube acting as a high voltage electrode. The reaction zone is formed between the capacitor-connected electrodes and the HV tube which can be made of any conducting metal, such as aluminum or steel. As in the previous embodiment, means are provided for passing a flow of natural gas or methane through the reaction zone while connecting the conductive metal tube to a pulsating HV source. In this manner, arc discharges are generated in the reaction zone between the metal tube, namely the HV electrode, and the rotating capacitor-connected electrodes. Thus, when AC high potential is applied to a number of capacitor-connected electrodes through the common HV electrode (metal tube), the arc discharge occurs homogeneously at each electrode area. Because the capacitor-connected electrodes are mounted on the central shaft and are rotating, the arc discharges are also rotating, which increases the reaction area and, therefore, the decomposition efficiency.

It should be noted that the International PCT Publication WO 2004/061929 A1 describes a plasma generator for producing ozone which uses a pair of electrodes without interposition of a dielectric body, and a capacitor in series therewith. It also requires a second capacitor in parallel with the electrodes for supplementing the power supply. Furthermore, it is indicated that the capacitor in series with the electrodes is an arc-suppression capacitor producing an arc-suppressing discharge between the electrodes, thereby generating plasma. Moreover, according to this prior art disclosure, the electrode unit is composed of a floating electrode, and insulator arranged around the floating electrode and a ground electrode arranged around the insulator. This prior art system is therefore clearly different from the one of the present invention and is used for a completely different purpose.

The present invention will now be further described with reference to the appended drawings which illustrate various embodiments of the invention.

BRIEF DESCRIPTION OF THE DRAWINGS

FIG. 4 is a cross-sectional side view of one embodiment of an apparatus suitable for the purposes of the present invention;

FIG. 5 is a cross-sectional plan view of the apparatus shown in FIG. 4;

FIG. 6 is a partial cross-sectional side view of another embodiment of an apparatus suitable for the purposes of the present invention;

FIG. 7 is a cross-sectional plan view of the apparatus shown in FIG. 6;

DETAILED DESCRIPTION OF THE PREFERRED EMBODIMENTS

Figure 1:
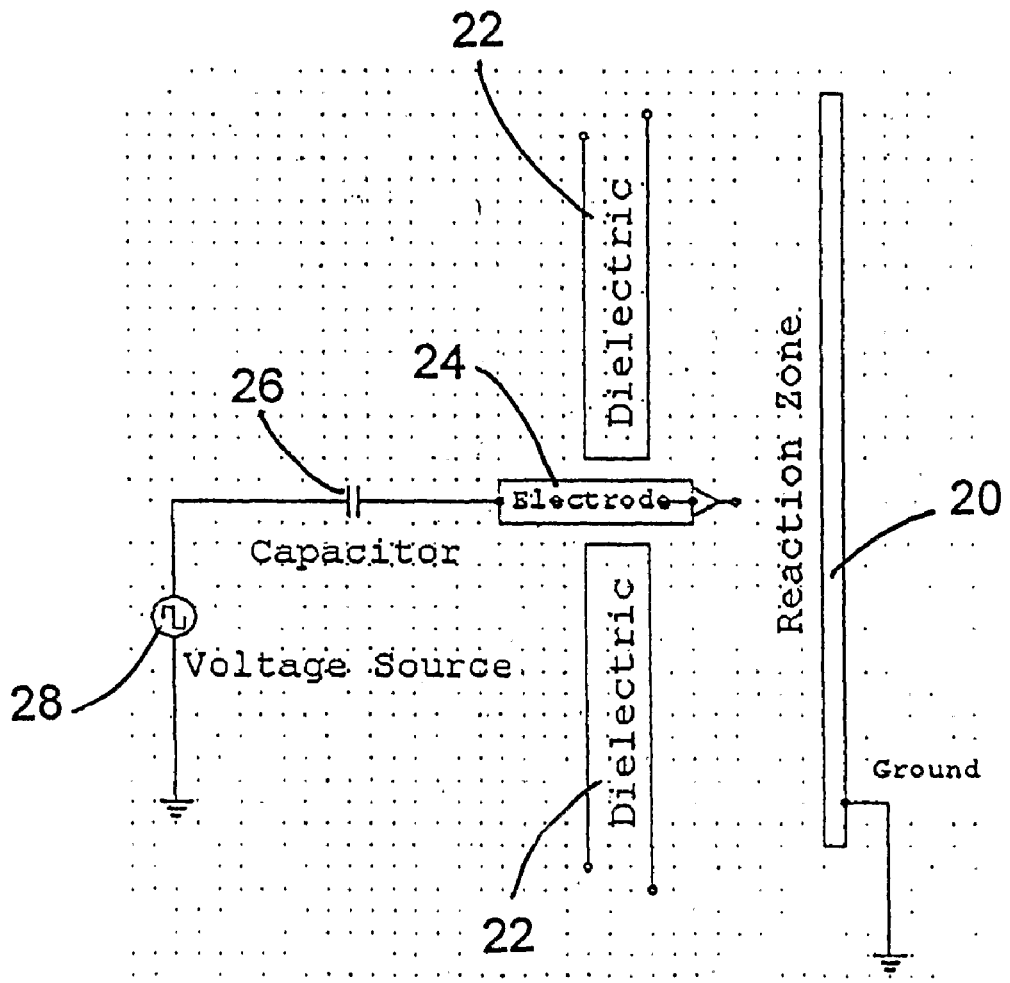
FIG. 1 is a schematic diagram of an embodiment of the system in accordance with the present invention for producing a cold arc discharge.

In the drawings in which the same elements are designated by the same reference numbers, FIG. 1 illustrates the basic set-up in accordance with one embodiment of the present invention. It provides a reaction zone between the ground electrode 20 and a wall of dielectric material 22. Through this wall 22 of dielectric material, a high voltage electrode 24 is projected which has a capacitor 26 in series therewith, and is connected through this capacitor 26 to a high voltage source 28. The high voltage source is preferably a high voltage line generating a pulsating high voltage discharge. The capacitor 26 blocks the current during the discharge and produces a cold arc discharge in the reaction zone between the HV electrode 24 and the ground electrode 20. This cold arc discharge is adapted to decompose the natural gas or methane flowing through the reaction zone into its gaseous constituents and solid carbon particles, which is achieved by controlling the frequency and duration of the cold arc discharge. The frequency of the arc is controlled by a microcontroller. There is no specific limit to the frequency that can be used, but at a certain point, the cold arc discharge will transform into thermal plasma and this should be avoided. Frequencies in the range of 1 kHz to 12 kHz are quite suitable. As far as the arc duration is concerned, it is mainly a function of the capacitor, although the power supply impedance will also have an effect on the arc duration. The arc duration may be determined by the current waveform during a discharge. A small capacitor will give very short current pulses, while a large capacitor will give longer current pulses. For example, a capacitor of 1000 pF gives a current pulse width of approximately 3 µs, whereas a capacitor of 100 pF gives a current pulse width of approximately 40 ns. Capacitors from about 100 pF to 1000 pF have been found quite suitable for the purposes of the present invention, although this range is not limitative. It should also be noted that the size of the gap has an effect on the current pulse duration because the discharge impedance is higher. Generally, pulse width durations between about 40 ns and 3 µs are satisfactory and produce good results in conjunction with frequencies of 1 kHz to 12 kHz, although again they are not limitative for the purposes of the present invention.

Figure 2A:
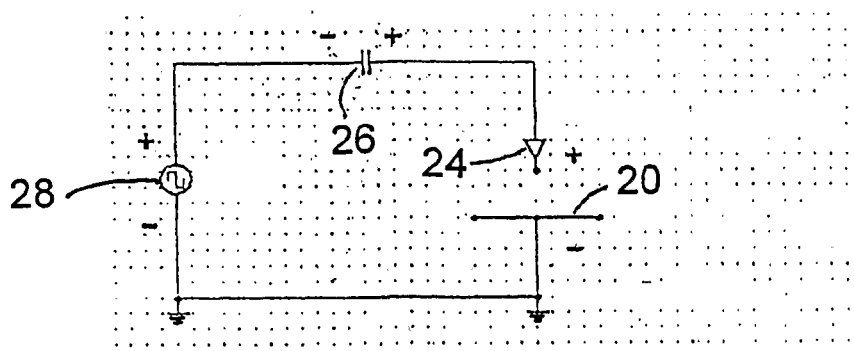
FIG. 2A is a schematic diagram illustrating the positive discharge taking place before cold arc-generating discharge.
Figure 2B:
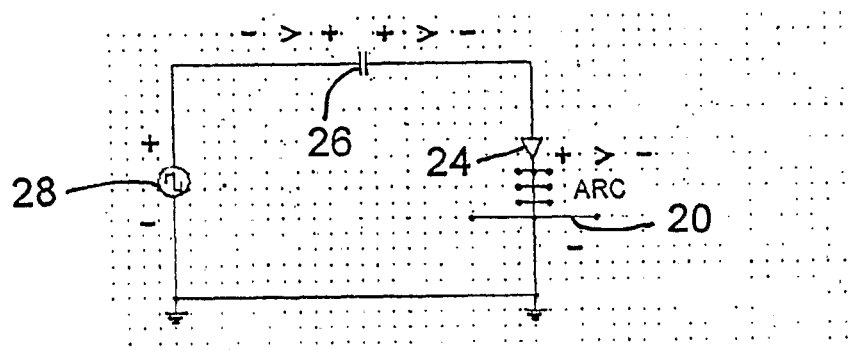
FIG. 2B is a schematic diagram illustrating the positive discharge taking place during the cold arc-generating discharge.
Figure 2C:
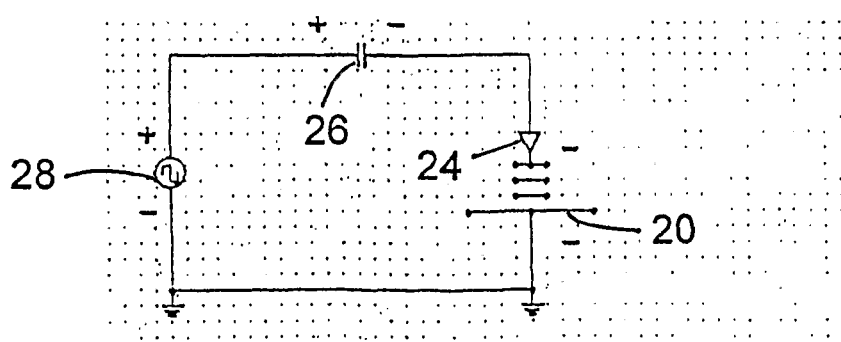
FIG. 2C is a schematic diagram illustrating the positive discharge taking place at the end of the cold arc-generating discharge.
Figure 3:
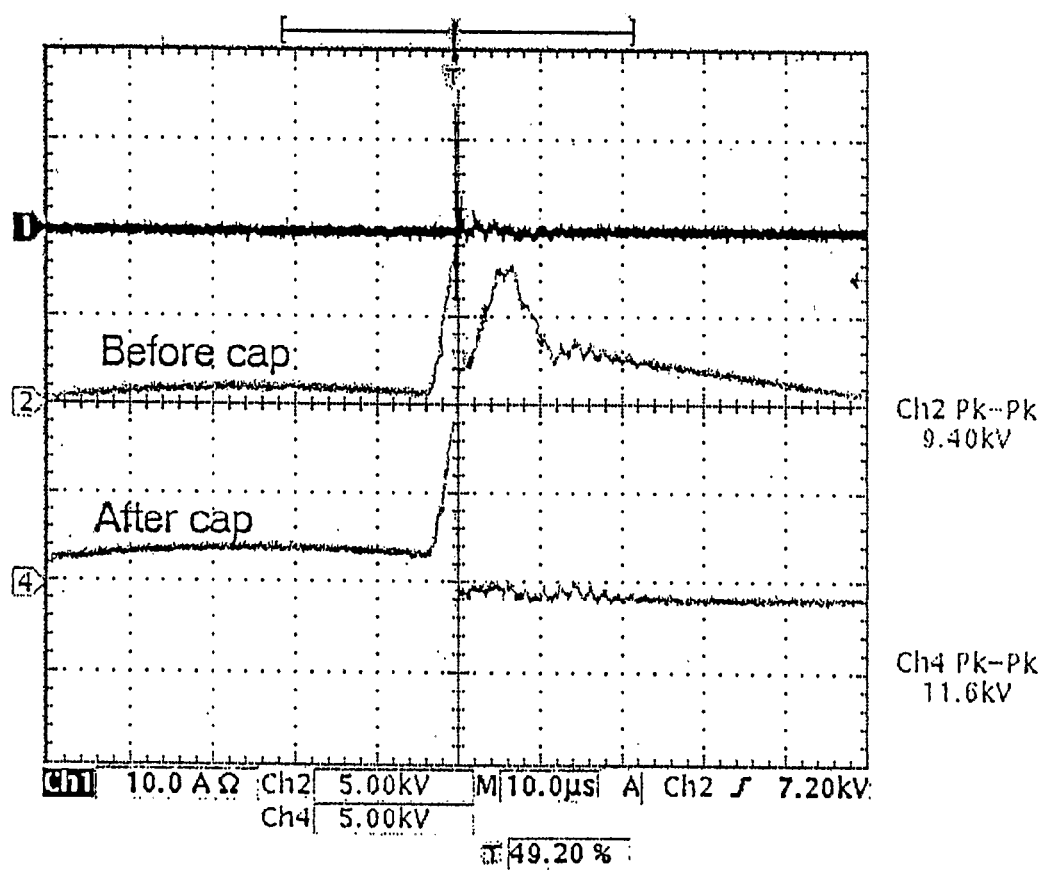
FIG. 3 is a graph showing voltage waveforms produced at the stages illustrated in FIGS. 2A, 2B and 2C respectively.

FIGS. 2A, 2B and 2C show the principle of a typical cold arc discharge in accordance with the present invention. In FIG. 2A the high voltage source 28, which generates pulsating voltage, is connected through the capacitor 26 to the HV electrode 24. It is assumed herein that the capacitor 26 is discharged and a positive pulse is starting. If it is not discharged, there will be a potential difference between the two capacitor leads as seen in FIG. 3 waveforms 2 and 4. When the voltage pulse starts to build up, the voltage across the electrodes 24 and 20 also starts to build up. The capacitor 26 is not charging since no current is flowing in the circuit, other than a small current due to leakage and ionization.

The polarity of the capacitor 26 has been set as shown in FIG. 2A, even though the capacitor was not charged. The waveforms 2 and 4 in FIG. 3 show the voltage of the capacitor 26 with reference to ground. When the voltage after the capacitor 26 reaches the breakdown voltage, an arc discharge starts to occur and both voltages of the capacitor 26 collapse. The current increases very fast, because the gap between the high voltage electrode and the ground electrode is conductive and the capacitor 26 is charging. Waveform 1 in FIG. 3 shows the current spikes. These spikes have risetime in the low nanoseconds.

During the arc discharge, illustrated in FIG. 2B, the voltage drop across the gap between the electrodes 24 and 20 is small; therefore the positive side of the capacitor 26 will change to negative, forcing the capacitor 26 to fully charge. When fully charged, the polarity of the capacitor 26 will be completely reversed and current will stop flowing. The arc will extinguish and the gap will no longer be conductive. At this point, the polarities of the capacitor 26 and of the gap will be as shown in FIG. 2C. Since no current (or very little) is flowing at this stage in the circuit, the voltage will rise again until the end of the pulse. In this case, the pulse width supplied by the pulses was 10 µs as can be seen on waveform 2 in FIG. 3. A similar procedure will happen for a negative pulse. Risetime and falltime are characterized by the load and the power supply. Resistance of the discharge and impedance of the power supply will determine the dynamic response of the system.

In FIG. 3 the top line indicates where the pulse trigger T is happening. In this case it is almost in the middle, namely at 49.20%, as indicated at the bottom.

The numbers shown on the left side of the graph are the scope's active channels, namely:

1—plasma current
2—high voltage before the capacitor in reference to ground-transformer voltage
3—high voltage after the capacitor in reference to ground-gap voltage The numbers to the right are:
"Ch2 Pk-Pk—9.40 kV"—This is channel 2 Peak-Peak maximum voltage reading
"Ch4 Pk-Pk—11.6 kV"—This is channel 4 Peak-Peak maximum voltage reading At the bottom there are indicated the scales for each channel and its units. Thus, 10.0 A Ω represents 10 ampere per division. Ω symbol means that this channel has the input set to 50 ohms. Other channels are at 1 Mohm.

"M10.0 µs" represents the time scale per division.

"A Ch2~7.2 kV" means that the scope is triggering on channel 2 and the trigger level is set to 7.2 kV. The 'A' in front means the trigger is in "AUTO" mode. It triggers on the rising edge of the signal.

Capacitance, gap discharge size and voltage level have an effect on conversion levels. Increasing capacitance has increased conversion levels, but at the same time it increases the production of heat. By increasing the capacitance, it takes more time to charge the capacitor, therefore the arc is sustained longer and more power from the source is needed. Gap distance also increases the conversion since the plasma volume is increased. As a consequence to gap increase, the voltage will also be increased because of higher potential needed to create breakdown.

It should be noted that the breakdown voltage is mainly a function of gap and frequency. For example, at a frequency of 8 kHz, the initial breakdown voltage can drop to about 6 kV and sustain a discharge with a gap of 5 mm and a capacitor of 100 pF. In another example, a continuous discharge (not initial) is obtained at 11 kV with a capacitor of 500 pF at the same frequency of 8 kHz. For the purposes of the present invention, preferred gaps are between 2.5 mm and 7.5 mm with initial voltages between 15 kV and 25 kV depending on the gap and frequency used.

FIG. 4 and FIG. 5 show an embodiment of a reactor 30 that is suitable for the purposes of the present invention. It has a tubular configuration with a rotary ground electrode 20 and a plastic wall 22 through which four rows of HV electrodes 24 are mounted in a triangular arrangement shown in FIG. 5. The high voltage bus 25 for the HV electrodes 24 is provided in the middle of the four rows on the outside of the plastic wall 22. Pulsating high voltage discharge from a suitable source (not shown) is supplied through the bus 25 and through the capacitors 26 to the HV electrodes 24 thereby generating cold arc discharges in the reaction zone between the ground electrode 20 and the HV electrodes 24, while natural gas or methane (indicated as NG INPUT) is fed at the input end 31 and flows through the reaction zone where it is transformed into products of the reaction which exit at the output end 32.

The configuration shown in FIG. 6 and FIG. 7 further provides a positive pressure chamber 34 through which natural gas or methane is fed into the reaction zone via additional ports 31A and 31B. This is in addition to the flow via input 31. The chamber 34 may be formed by an enclosure 36 which may be made of any suitable material that is not easily damaged by arcs. For this reason, the material is preferably a ceramic material, but some plastics would also be suitable.

This arrangement helps to reduce or eliminate carbon buildup on the surface of the plastic wall 22 since, due to the positive pressure in the chamber 34 with reference to the reaction zone, carbon particles formed during the process cannot enter said chamber 34 and be deposited on the wall 22, thereby preventing shorts between HV electrodes 24. Moreover, the flow of natural gas coming out of the hole 36 from within chamber 34 should be suitably controlled since the time the natural gas spends in the reaction zone affects the conversion rate of the reaction. Generally, the flow of $CH_4$ passing through the reaction zone may be anywhere between 1 $m^3$/hr and 250 $m^3$/hr depending on the number of electrodes used. Although in this embodiment only one set of HV electrodes 24 is shown, arranged in a triangular configuration, several rows of such electrodes could be provided in a similar fashion as shown in FIGS. 4 and 5. All such electrodes are, of course, provided with capacitors in series and are connected to a source of pulsating high voltage as previously explained.

Figure 8:
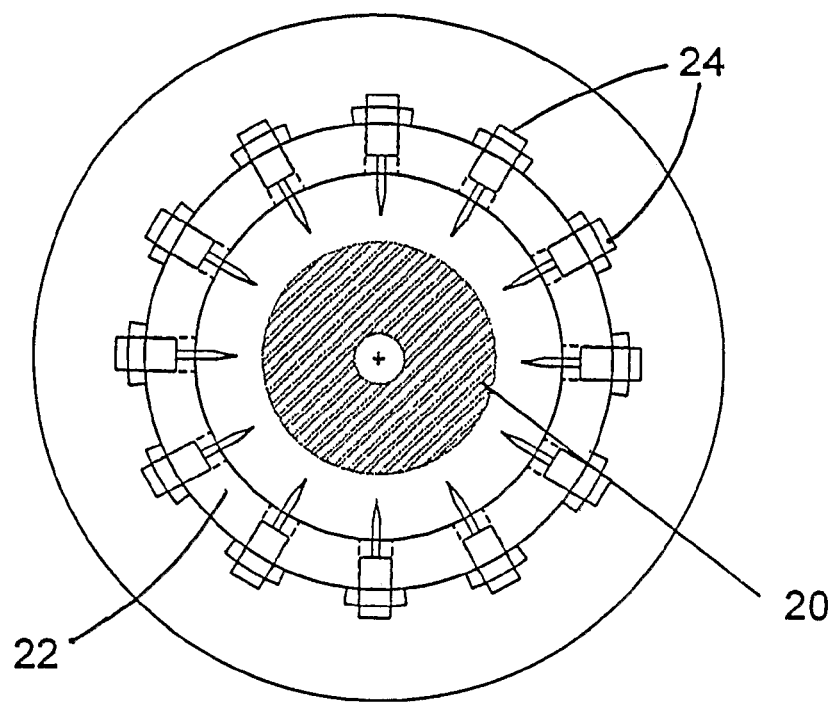
FIG. 8 is a plan view of another embodiment of the reactor suitable for the purposes of the present invention.
Figure 9:
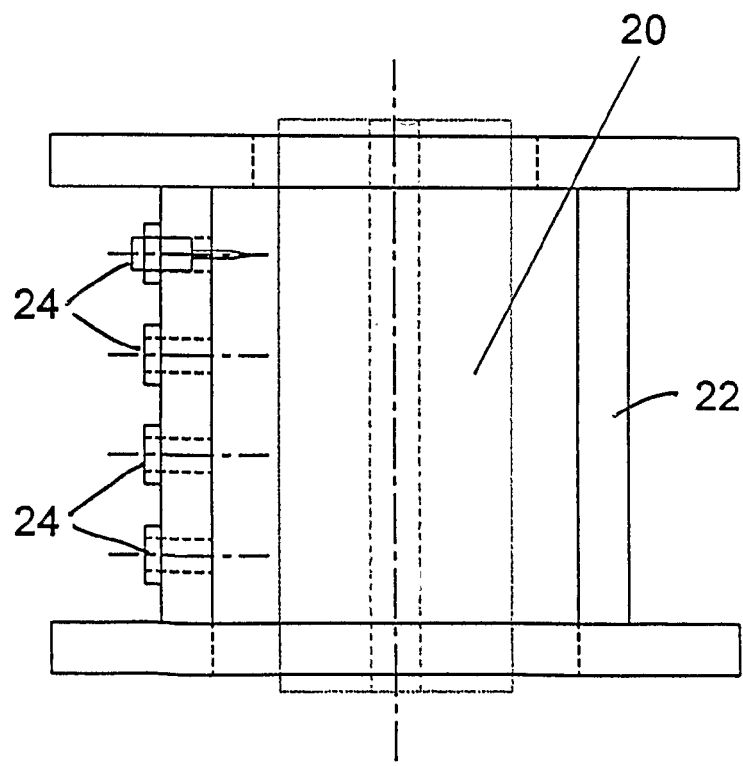
FIG. 9 is a cross-sectional side view of the reactor shown in FIG. 8.

FIG. 8 and FIG. 9 show another arrangement of HV electrodes 24 within a tubular reactor with a rotatable ground electrode 20 in the middle. In this arrangement, there are four rows of 12 HV electrodes per row mounted in the plastic wall 22. Although this is not shown in FIGS. 8 and 9, each HV electrode 24 is connected to a capacitor in series and to a source of pulsating high voltage in a similar manner as shown in FIGS. 4 and 5.

Figure 10:
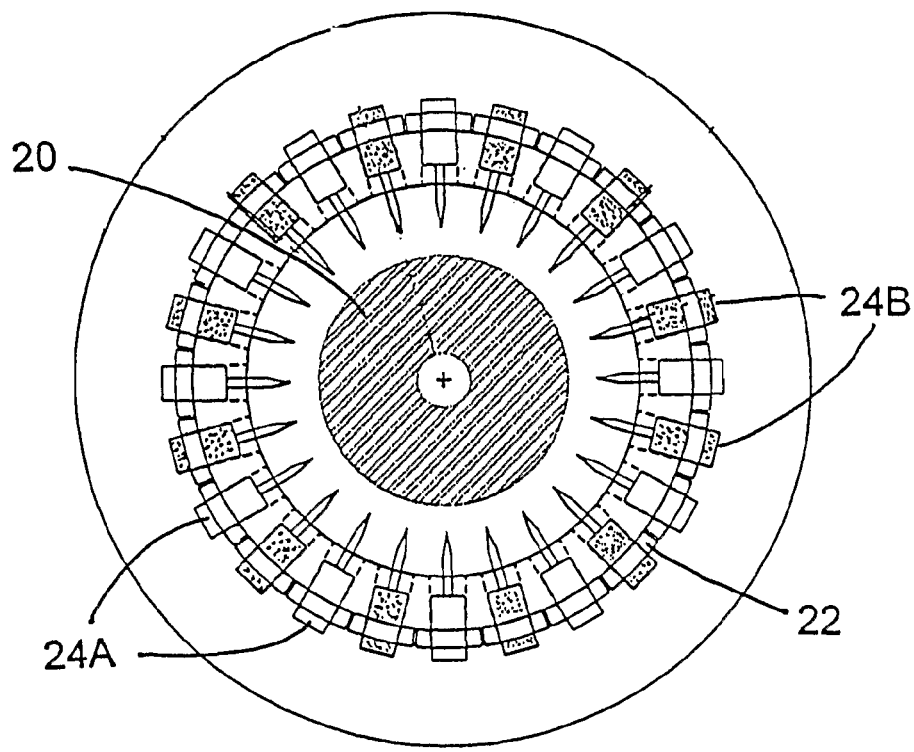
FIG. 10 is a plan view of a still further embodiment of the reactor suitable for the purposes of the present invention.
Figure 11:
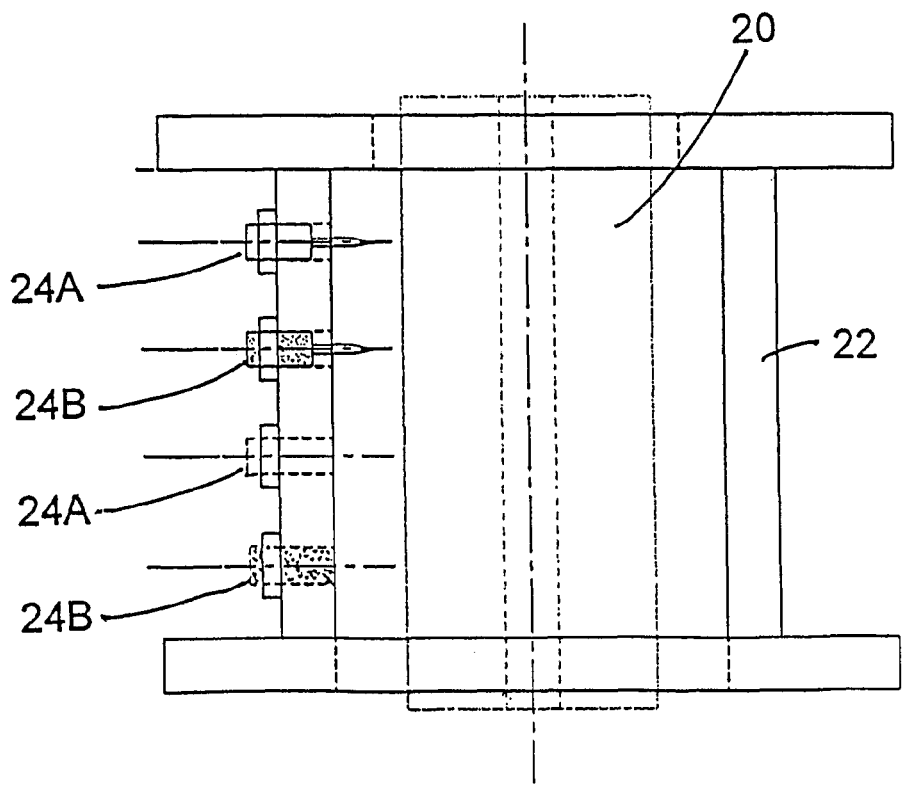
FIG. 11 is a cross sectional side view of the reactor shown in FIG. 10.

A still further embodiment is illustrated in FIG. 10 and FIG. 11 where the HV electrodes 24A and 24B are positioned in four rows in the wall 22, but in a staggered arrangement. The ground electrode 20 is again provided in the center and is preferably rotatable. This staggered arrangement of the HV electrodes helps to avoid arcing between the HV electrodes. Again, each HV electrode is connected to a capacitor in series and a source of pulsating high voltage generally as shown in FIGS. 4 and 5.

Figures 12, 13:
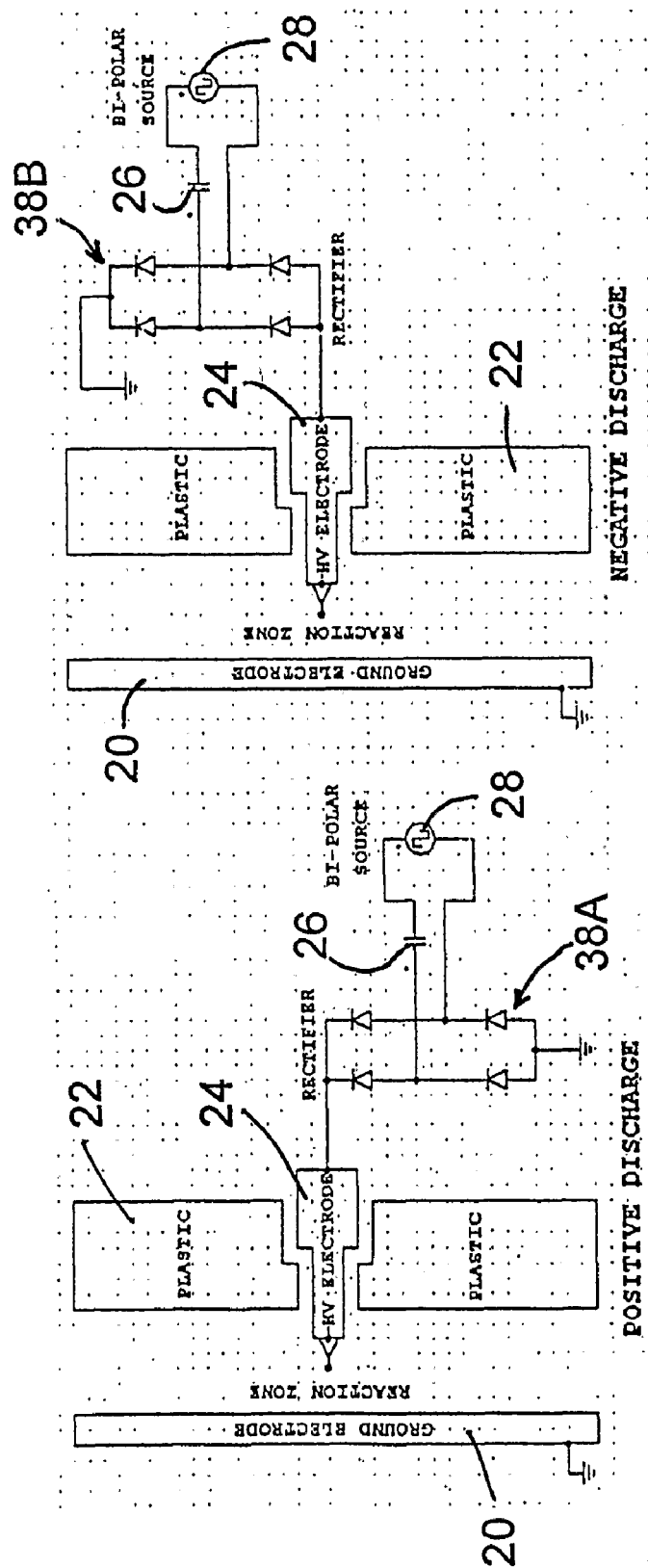
FIG. 12 is a schematic diagram of a further embodiment of the present invention using a bi-polar source and a rectifier with a positive discharge to produce a cold arc.
FIG. 13 is a schematic diagram similar to that of FIG. 12 but adapted for a negative discharge.

Further embodiments of the invention are illustrated in FIG. 12 and FIG. 13. In previous embodiments, the high voltage source produced a standard type of bi-polar pulsating high voltage discharge. With such bi-polar discharge, a buildup of carbon may be formed on the plastic wall causing conductive paths between the HV electrodes and thereby reducing the effectiveness of some electrodes. Thus, it may be preferable that carbon be attracted only to the ground electrode which, being rotatable, will make it more difficult to form a heavy build up of carbon, but rather will allow it to pass with the gas toward the exit. On the other hand, with some arrangements, it may be preferable that carbon be attracted toward the outer plastic wall and repelled from the ground electrode. These conditions may be obtained by providing a unipolar pulsating high voltage discharge to the HV electrode which is either positive or negative.

As shown in FIG. 12, the unipolar positive discharge is provided by using a high voltage rectifier 38A after the capacitor 26 to which the high voltage pulsating current is supplied from a standard bi-polar source 28. From this rectifier, a positive discharge is imparted to the HV electrode 24 which produces a cold arc in the reaction zone between the ground electrode 20 and the plastic wall 22. This cold arc decomposes $CH_4$ mainly into carbon and hydrogen as already described previously and provides a condition whereby carbon will be attracted only to the ground electrode 20.

On the other hand, as shown in FIG. 13, a high voltage rectifier 38B may be used after the capacitor 26 to impart a negative unipolar discharge to the HV electrode 24, leading to a cold arc discharge in the reaction zone that will produce the attraction of carbon toward the plastic wall 22, if this is found desirable.

Figure 14:
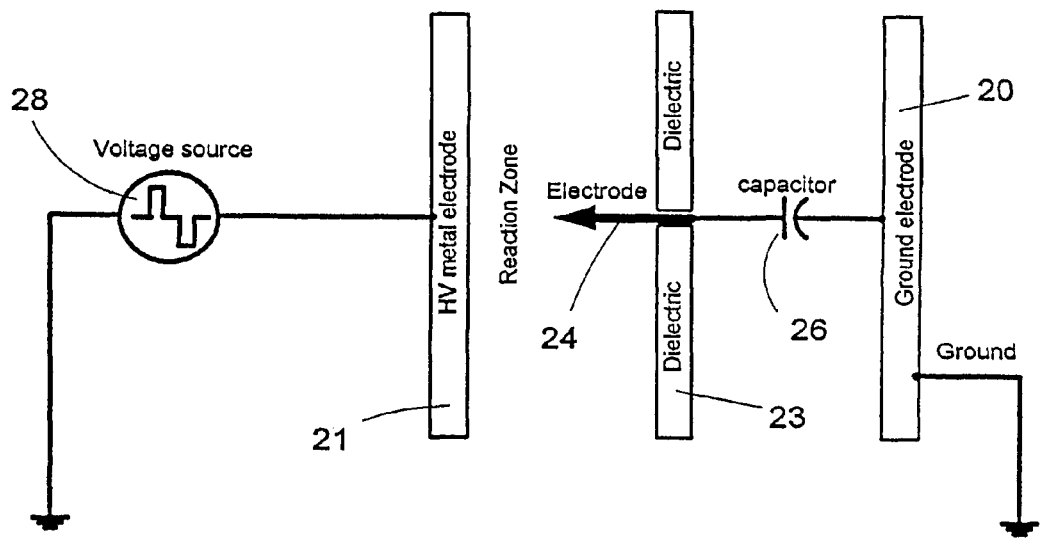
FIG. 14 is a schematic diagram of another embodiment of the system suitable for producing a cold arc discharge in accordance with the present invention.

In a further embodiment of the present invention, illustrated in FIGS. 14 to 17, the high voltage source is connected to a HV metal electrode and the capacitor-connected electrodes are connected to the ground through a dielectric element which is preferably rotatable. The dielectric element 23 is used to physically support the electrode 24 and to separate electrode 24 from the ground electrode 20 as well. Thus, FIG. 14 illustrates the general principle of this alternative system, showing the pulsating high voltage source 28 which is connected to a HV metal electrode 21 and the electrode 24, in series with the capacitor 26, is connected through the dielectric element 23 to the ground. The reaction zone is formed between the HV metal electrode 21 and the electrode 24 which is connected through the capacitor 26 to the ground.

Figure 15:
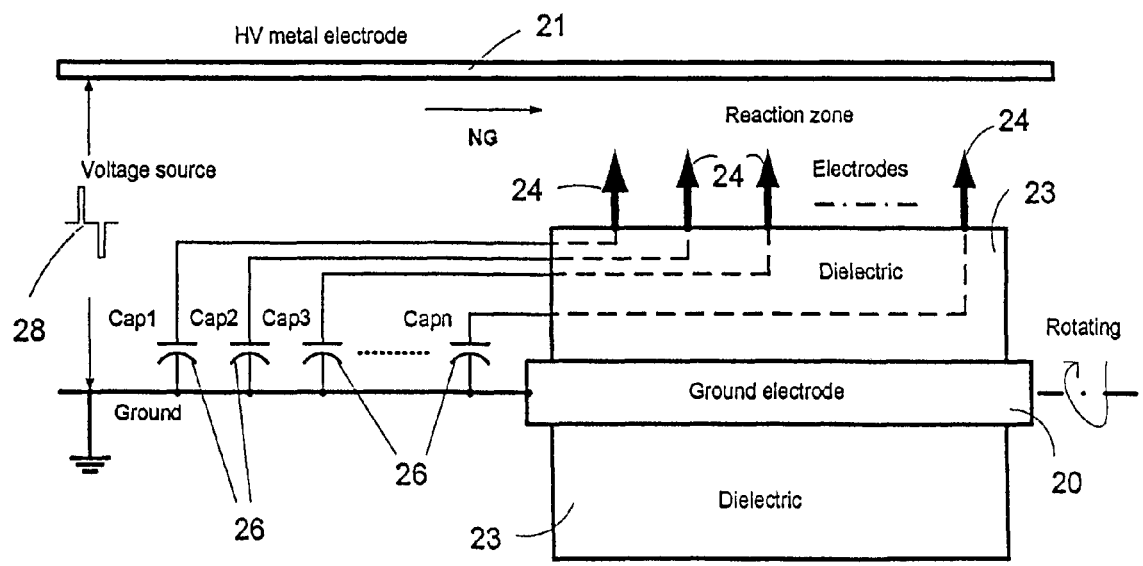
FIG. 15 is a schematic diagram of a system such as shown in FIG. 14, but illustrating use of a plurality of capacitor-connected electrodes and a rotating arc discharge.

FIG. 15 illustrates the use of a plurality of electrodes 24 each connected to its own capacitor CAP 1, CAP2, CAP3 . . . CAPn and each in turn connected to the common ground after the capacitor. The voltage source 28 is connected to the common HV metal electrode 21 and provides an AC high potential to the capacitor-connected electrodes 24. The cold arc discharge occurs homogeneously at each electrode 24 in the reaction zone between these electrodes 24 and the common HV electrode 21 which is a metal tube surrounding the dielectric rotating shaft 23. This is done while $CH_4$ (herein identified as NG) flows through the reaction zone and is converted into its constituents as already described previously.

Figures 16, 17:
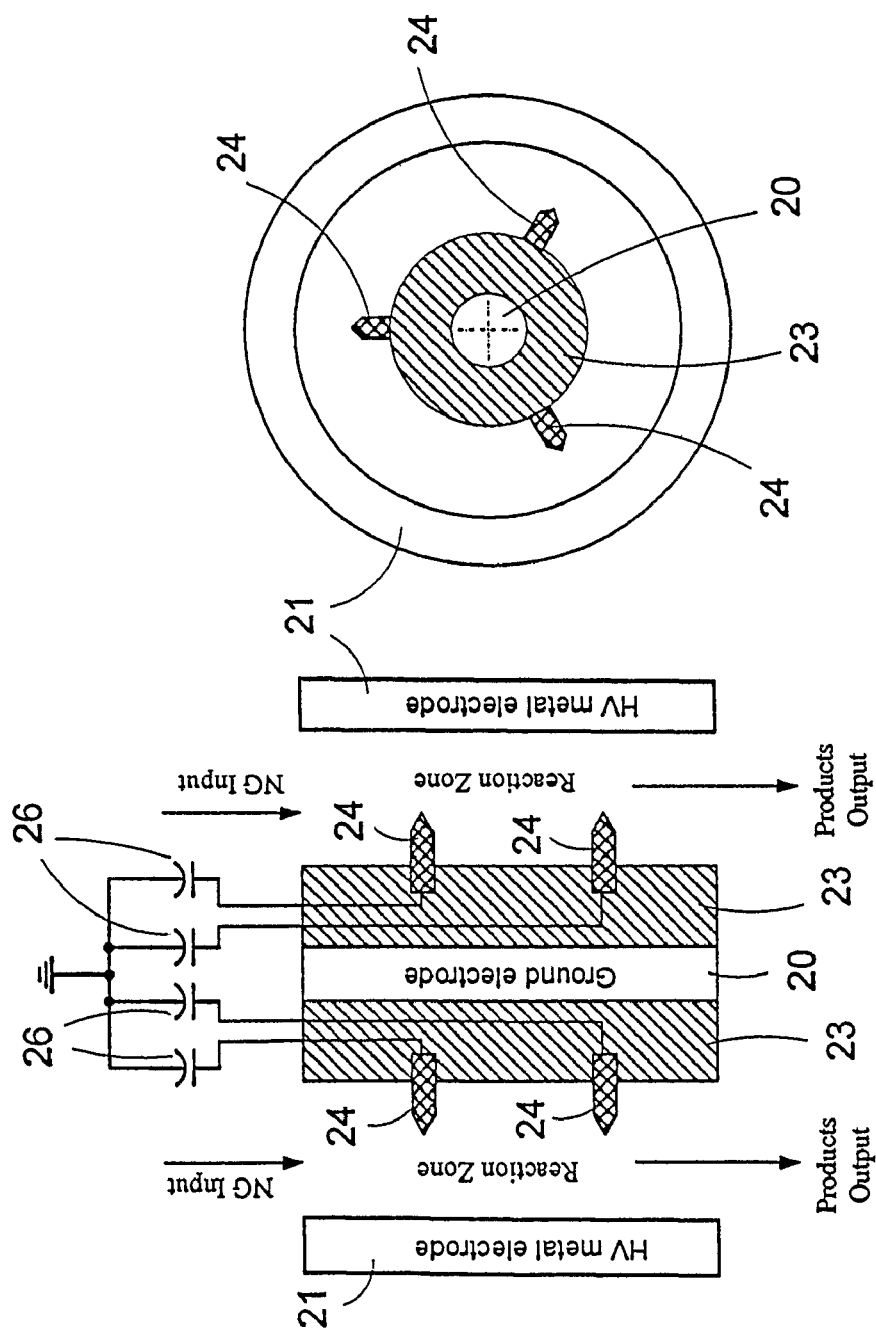
FIG. 16 is a cross-sectional side view of an apparatus using a system such as shown in FIG. 15.
FIG. 17 is a cross-sectional plan view of an apparatus shown in FIG. 16.

A further, more detailed design of this system is illustrated in FIGS. 16 and 17 which show respectively a longitudinal and a plan section of the apparatus. Thus, the electrodes 24 are embedded in the central shaft 23 made of dielectric material, such as plastic or ceramic, and are connected to capacitors 26 in series with the electrodes 24 which in turn are connected to a common ground. The dielectric shaft 23 is rotatable and thus the electrodes 24 are rotating therewith when in operation. The pulsating high voltage source (not shown in these figures) is connected to the metal tube 21 representing a common HV electrode and thereby providing an AC high potential to the electrodes 24 with resulting cold arc discharge in the reaction zone between the rotating electrodes 24 and the surrounding HV electrode 21. The NG is input at the top of the reaction zone and flows therethrough while being decomposed into its gaseous components and carbon that are withdrawn as products output.

Apart from the change in configuration set out in FIGS. 14 to 17, all the other features and conditions remain essentially the same.

Example of Operation

Figure 18:
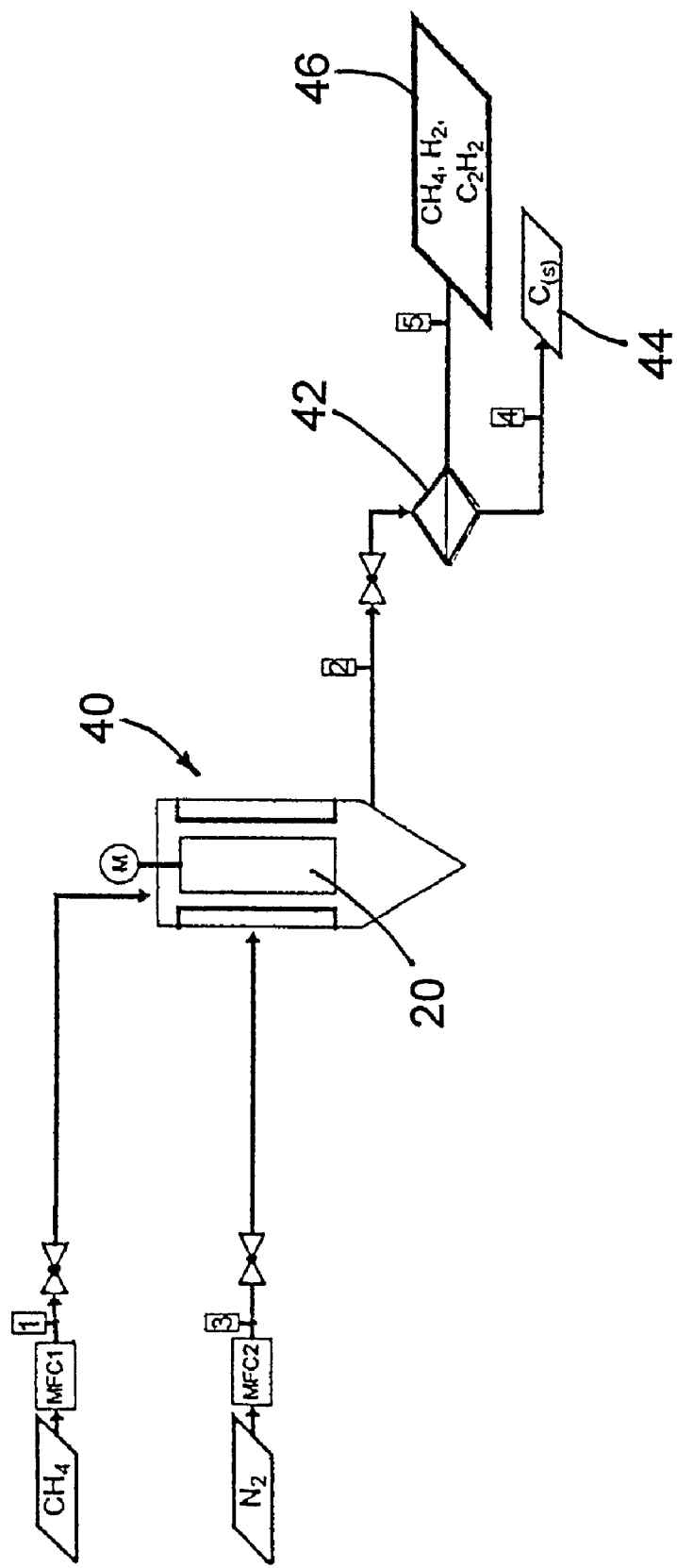
FIG. 18 is a flow diagram illustrating the process of the present invention.

A non-limitative example of the method of operation of the system of the present invention is now described in conjunction with FIG. 18. As shown in this figure, natural gas or methane (CH.sub.4) is fed through a flow measuring device MFC1 and through line 1 into the top of the reactor 40. In this example, the flow rate was 17 L/min. Nitrogen is fed through a flow measuring device MFC2 and line 3 to provide an inert atmosphere around the reactor for safety reasons. Other inert gases or a transformer oil can also be used to isolate the central core of the reactor from the ambient and thereby avoid sparks. The reactor 40 has an internal construction such as illustrated in FIGS. 4 and 5, in which there are provided 12 HV electrodes positioned 3 per plane in four planes over the height of the reactor. The ground electrode 20 in the center is rotated by motor M at a speed of 200 RPM. The ground electrode 20 made of aluminum supplies the ground for the electric current that is passed through the HV electrodes during the operation. Each HV electrode is adjusted so as to have a gap of 5 mm between the tip of the HV electrode and the surface of the ground electrode. A 100 pico-farad capacitor was connected in series to each electrode and in turn connected to a central bus bar as shown in FIGS. 4 and 5. A voltage of 22 kV at a frequency of 8 kHz was then applied to the capacitors and the resulting power of 800 W produced a cold arc discharge in the gap between each HV electrode and the rotating ground electrode.

The process resulting from this operation has converted natural gas or methane into its two main constituents, according to the following reaction:

$$CH_4 \rightarrow C_{(s)} + H_2$$

Various other complementary reactions that also occur during the process give trace amounts of other compounds. However, these unwanted compounds are very minute with the exception of acetylene ($C_2H_2$) which is produced in a measurable amount. The resulting gas is then passed from the bottom part of the reactor 40 via line 2 through a HEPA (high efficiency particle arrester) 42 to collect the solid carbon particles that proceed via line 4 to a vessel 44. The remaining mixture of $H_2$ and $C_2H_2$ as well as unreacted $CH_4$ proceed via line 5 to equipment 46 that measures the gas composition. In the present example, the concentration of gases in the product stream was as follows: $H_2$=17.48 mol %; $C_2H_2$=3.07 mol % and $CH_4$=79.45 mol %

Although the gas portion resulting from the above process could further be treated to separate hydrogen from the other two gases in the mixture, it should be noted that the resulting gas is essentially hythane which is a gas consisting of about 80% methane and 20% hydrogen, and is a product in its own right since it can be used as a fuel for internal combustion engines. For example, U.S. Pat. No. 5,516,967 discloses a direct conversion of methane to hythane by subjecting methane to a controlled oxidation with water vapor at a temperature of 400 to 500° C. and at a pressure from 1 to 5 atmospheres, in the presence of a particular catalyst. In the present process, hythane is also produced directly but using cold arc discharge instead of controlled oxidation. In the example given above, 0.9 kilowatts were used to produce 1 cubic meter of hythane which included a minor proportion of acetylene.

It should be understood that various modifications that would be obvious to those skilled in the art can be made to the method and apparatus of the present invention without departing from the following claims.

The invention claimed is:

1. A method for decomposing natural gas or methane which comprises:
    (a) passing a flow of natural gas or methane through a reaction zone having a ground electrode on one side and a wall of dielectric material on the other, and having at least one high voltage (HV) electrode projecting through the wall of dielectric material, with a capacitor being provided in series with the HV electrode;
    (b) imparting a pulsating high voltage discharge through said capacitor and into said HV electrode so as to produce a cold arc discharge in the reaction zone between said HV electrode and the ground electrode, which cold arc discharge decomposes the natural gas or methane into its gaseous constituents and carbon in the form of solid particles; and
    (c) separating the carbon particles from the gaseous constituents essentially consisting of hydrogen and acetylene mixed with unreacted natural gas or methane.

2. A method according to claim 1, in which a plurality of HV electrodes are provided in the reaction zone.

3. A method according to claim 1, in which the pulsating high voltage discharge imparted to the HV electrode is unipolar or bi-polar.

4. A method of decomposing natural gas or methane which comprises:
    (a) passing a flow of natural gas or methane through a reaction zone formed between a capacitor-connected electrode on one side and a high voltage (HV) electrode on the other side, the capacitor-connected electrode extending through a dielectric element and being connected in series with a capacitor that is connected to the ground; and
    (b) connecting a pulsating high voltage source to the HV electrode so as to generate a cold arc discharge in the reaction zone between the HV electrode and the capacitor-connected electrode, said cold arc discharge decomposing the natural gas or methane into its gaseous constituents and carbon in the form of solid particles.

5. A method according to claim 4, in which a plurality of capacitor-connected electrodes and a common HV electrode are provided to form the reaction zone.

6. A method according to claim 4, in which the pulsating high voltage source is unipolar or bi-polar.

7. Apparatus for decomposing natural gas or methane which comprises:
    a reactor with a reaction zone;
    means for passing a flow of natural gas or methane through said reaction zone; and
    means for generating at least one high frequency cold arc discharge in said reaction zone such as to convert any of the natural gas or methane flowing through the reaction zone into its gaseous constituents and carbon in the form of solid particles, in which the reactor has a tubular shape with a rotatable cylindrical ground electrode in the middle and with a cylindrical outer wall of dielectric material through which a plurality of said high voltage (HV) electrodes extend into the reaction zone, each of HV electrodes is provided with a capacitor in series and is connected, through said capacitor, to a pulsating high voltage source such as to produce the at least one high frequency cold arc discharge between each HV electrode and the ground electrode.

8. Apparatus according to claim 7, in which the outer wall of dielectric material is made of plastic or ceramic.

9. Apparatus according to claim 7, in which there are provided several rows of HV electrodes over the reactor's vertical length, with a plurality of HV electrodes in each row.

10. Apparatus according to claim 9, in which the HV electrodes in one row are staggered with relation to the HV electrodes in the next row.

11. Apparatus according to claim 7, further comprising an enclosure between the outer wall and the ground electrode with an opening to the reaction zone and means are provided for feeding natural gas or methane into said enclosure and through said enclosure into the reaction zone, and to maintain a positive pressure in said enclosure with reference to the reaction zone.

12. Apparatus according to claim 7, further comprising a rectifier between each capacitor and HV electrode for producing a unipolar positive or negative cold arc discharge in the reaction zone.

13. Apparatus comprising:
    a reactor with a reaction zone;
    means for passing a flow of natural gas or methane through said reaction zone; and
    means for generating at least one cold arc discharge in said reaction zone such as to convert any of the natural gas or methane flowing through the reaction zone into its gaseous constituents and carbon in the form of solid particles, in which the reactor has a tubular shape with a rotatable cylindrical shaft in the middle made of dielectric material and a tubular high voltage (HV) electrode surrounding said shaft, the reaction zone being formed between said shaft and said HV electrode; a plurality of electrodes are embedded in the rotatable cylindrical shaft and project outwardly therefrom in the reaction zone, each of said electrodes being connected to a capacitor and then to common ground; and a pulsating high voltage source is connected to the HV electrode such as to generate the at least one cold arc discharge between each capacitor-connected electrode and the common HV electrode in the reaction zone.

14. Apparatus according to claim 13, in which the shaft of dielectric material is made of plastic or ceramic.

15. Apparatus according to claim 13, in which several rows of capacitor-connected electrodes are mounted on the shaft.

16. Apparatus according to claim 13, further comprising means for creating an inert atmosphere around the reactor.

17. Apparatus according to claim 13, further comprising a high frequency particle arrester for separating the solid carbon particles exiting from the reactor from the gaseous constituents.

18. Apparatus according to claim 17, further comprising means for analysing the composition of the gaseous constituents after their separation from the solid carbon particles.

\* \* \* \* \*